(12) United States Patent
Martin et al.

(10) Patent No.: US 9,151,235 B2
(45) Date of Patent: Oct. 6, 2015

(54) METHOD AND SYSTEM FOR FUEL VAPOR CONTROL

(71) Applicant: Ford Global Technologies, LLC, Dearborn, MI (US)

(72) Inventors: Douglas Raymond Martin, Canton, MI (US); Kevin Aguilar, Sterling Heights, MI (US); Alessandra Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 605 days.

(21) Appl. No.: 13/623,684

(22) Filed: Sep. 20, 2012

(65) Prior Publication Data

US 2014/0076285 A1    Mar. 20, 2014

(51) Int. Cl.
| | |
|---|---|
| F02M 25/08 | (2006.01) |
| F02D 33/00 | (2006.01) |
| F02D 41/00 | (2006.01) |
| F02M 37/00 | (2006.01) |
| B60K 15/03 | (2006.01) |
| F02D 29/02 | (2006.01) |

(52) U.S. Cl.
CPC ............ *F02D 33/006* (2013.01); *F02D 41/003* (2013.01); *F02M 25/0809* (2013.01); *F02M 37/0076* (2013.01); *B60K 2015/0321* (2013.01); *B60K 2015/03072* (2013.01); *B60K 2015/03078* (2013.01); *F02D 29/02* (2013.01)

(58) Field of Classification Search
CPC ..... F02D 33/006; F02D 41/003; F02D 29/02; F02M 37/0076; F02M 25/0809; B60K 2015/03078; B60K 2015/0321; B60K 2015/03217; B60K 2015/03072
See application file for complete search history.

(56) References Cited

U.S. PATENT DOCUMENTS

| | | | | |
|---|---|---|---|---|
| 3,174,550 | A * | 3/1965 | Bugg | 169/44 |
| 3,876,011 | A * | 4/1975 | Poitras | 169/57 |
| 4,633,967 | A * | 1/1987 | Kranz | 180/274 |
| 7,854,288 | B2 * | 12/2010 | Thompson et al. | 180/271 |
| 7,896,121 | B2 * | 3/2011 | Thompson et al. | 180/271 |
| 2007/0108348 | A1 * | 5/2007 | Peters | 244/135 R |
| 2007/0119605 | A1 | 5/2007 | Williams | |
| 2007/0251706 | A1 | 11/2007 | Williams | |
| 2015/0083089 | A1 * | 3/2015 | Pearce et al. | 123/520 |

\* cited by examiner

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

Methods and systems are provided for reducing fuel vapor generation from a fuel tank in a hybrid vehicle. A layer of gel-foam fire retardant is layered over the surface of fuel in the fuel tank. In response to the layer being below a fuel level in the fuel tank, fuel pump operation may be automatically disabled.

18 Claims, 4 Drawing Sheets

METHOD AND SYSTEM FOR FUEL VAPOR CONTROL

FIELD

The present application relates to reducing fuel vapor generation in vehicles, such as hybrid vehicles.

BACKGROUND AND SUMMARY

Vehicle emission control systems may be configured to store fuel vapors from fuel tank refueling and diurnal engine operations in a fuel system canister. During subsequent engine operation, the fuel vapors are purged to the engine with the purging carefully controlled so as to meet stringent federal emissions regulations.

The inventors herein have recognized that fuel vapor management, including the recovering and disposing of fuel vapors, can add substantial cost and complexity to a vehicle's fuel system. For example, in hybrid vehicles where the reduced frequency of engine operation prolongs the duration between purging opportunities, the use of a sealed steel tank or a bladder tank that can store a large amount of fuel vapors can add substantial costs. As another example, a hybrid vehicle's fuel economy may be affected if the engine has to be operated to enable the stored vapors to be ingested into the engine.

Thus in one example, some of the above issues may be at least partially addressed by a method for a vehicle fuel system, comprising floating a layer of gel-foam fire retardant on a surface of liquid fuel in a fuel tank to reduce an amount of fuel vapors generated in a dome region of the fuel tank, the vehicle being an on-road vehicle. In this way, fuel vapor generation can be reduced at a low cost.

In one example, a vehicle fuel system may include a fuel tank for delivering fuel to engine cylinders. The fuel tank may include a fuel pump coupled therein. A layer of gel-foam fire retardant may be layered on the fuel such that the layer floats on the surface of the liquid fuel. The layer may be a single continuous layer and may remain in place throughout the life of the vehicle, with replacements performed only as necessary. By positioning the layer on the fuel surface, fuel vapor generation (e.g., diurnal losses) may be reduced. Control of the fuel pump may be tied to a position of the layer within the fuel tank so as to enable the pump to be shut off before any of the gel-foam fire retardant is ingested into a fuel pump inlet. In addition, a bottom of the fuel tank may be modified with a depression for housing the fuel pump. For example, the layer of gel-foam fire retardant may be coupled to a fuel level sensor (such as a fuel level sensing arm with a float) that monitors a position of the layer in the fuel tank relative to a threshold position, wherein the threshold position is based on a road incline, vehicle rate of acceleration/deceleration, rate of vehicle lateral acceleration (e.g., turning,), steering wheel angle, yaw, etc. As such, changes to any of these parameters may affect a position of the gel-foam fire retardant relative to a location of the fuel pump inlet. Thus, by enabling pump operation only if the layer is sufficiently distant from the threshold position and by disabling the pump in response to the layer being sufficiently close to the threshold position, ingestion of gel-foam fire retardant in the fuel pump is obviated.

In this way, a simple and cost effective solution is provided for reducing evaporative emissions. By layering a gel-foam fire retardant on the surface of fuel in a fuel tank coupled to an on-road vehicle, the evaporative emissions benefits of a bladder tank can be achieved for a fraction of the cost of a bladder tank. In addition, the use of a gel-foam fire retardant in the layer allows unwanted fuel vaporization to be reduced in the event of tank degradation (e.g., tank rupture). By adjusting fuel pump operation based on the position of the layer within the fuel tank, ingestion of the gel-foam fire retardant into the fuel pump can be reduced. By reducing evaporative emissions, vapor purging frequency is reduced, and fuel economy penalties incurred during the purging of fuel vapors, particularly in a hybrid vehicle, can be reduced.

It will be understood that the summary above is provided to introduce in simplified form a selection of concepts that are further described in the detailed description, which follows. It is not meant to identify key or essential features of the claimed subject matter, the scope of which is defined by the claims that follow the detailed description. Further, the claimed subject matter is not limited to implementations that solve any disadvantages noted above or in any part of this disclosure.

BRIEF DESCRIPTION OF THE DRAWINGS

The subject matter of the present disclosure will be better understood from reading the following detailed description of non-limiting embodiments, with reference to the attached drawings, wherein.

DETAILED DESCRIPTION

Figure 1:
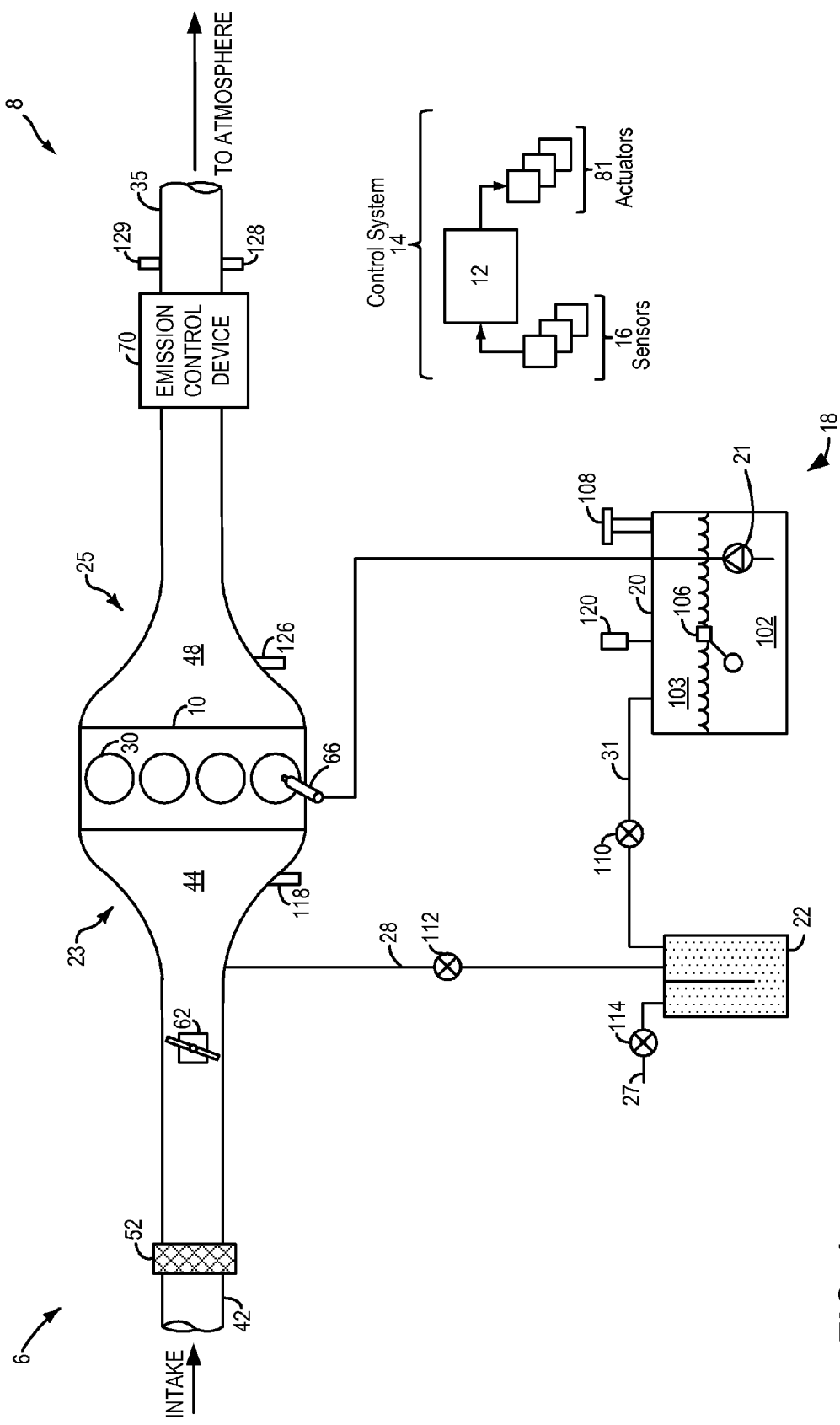
FIG. 1 shows a schematic depiction of a fuel system coupled to an engine system in a hybrid vehicle.
Figure 2:
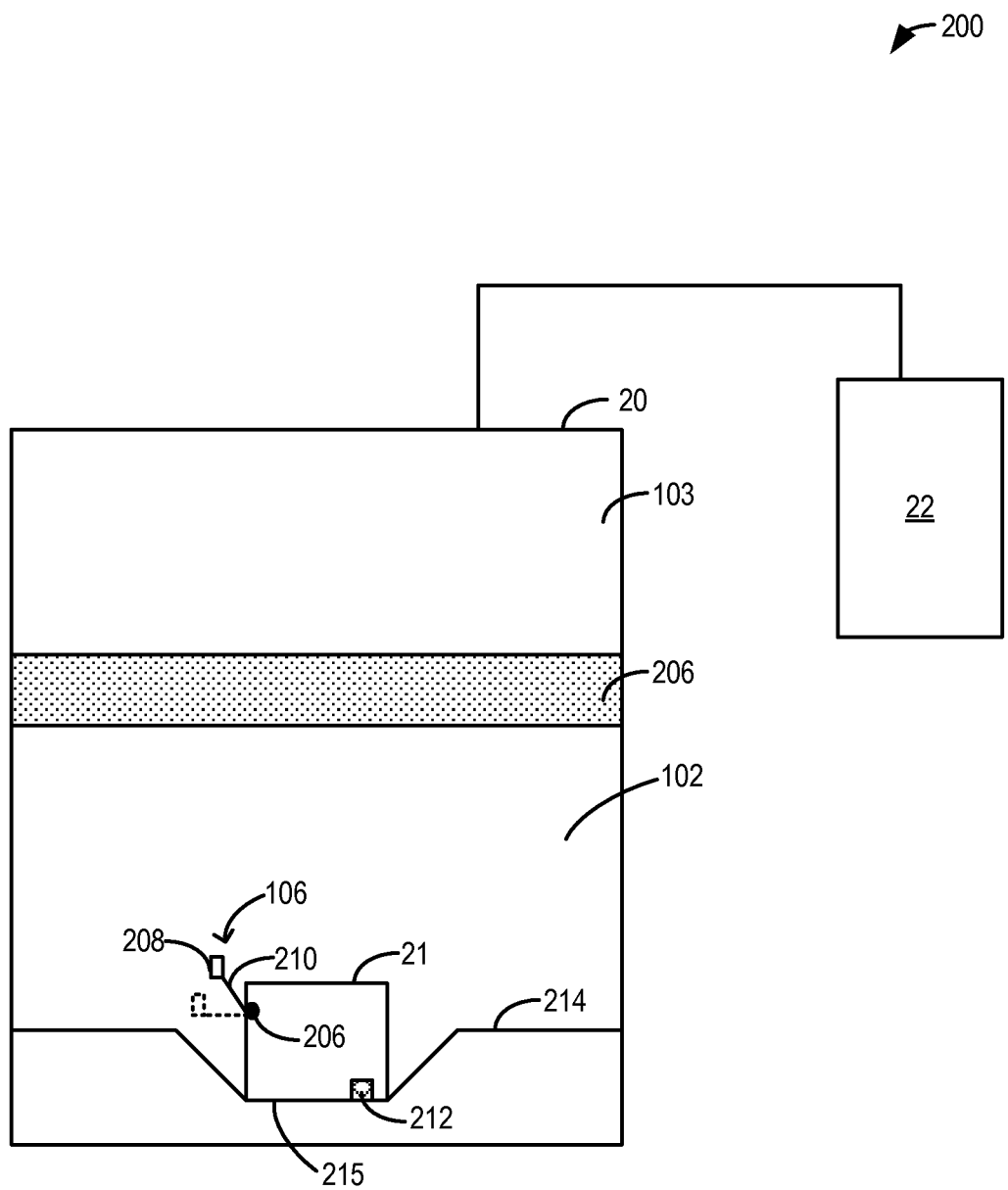
FIG. 2 shows a high level flow chart illustrating an example embodiment of the fuel tank of FIG. 1 including gel-foam fire retardant layered on the surface of fuel stored in the fuel tank.

Methods and systems are provided for reducing evaporative emissions in a fuel system coupled to a hybrid vehicle, such as the fuel system of FIG. 1. A fuel tank may be configured to include a layer of gel-foam fire retardant on the surface of fuel stored therein, as shown at FIG. 2. A controller may be configured to perform a control routine, such as the example routine of FIG. 3, to adjust operation of a fuel pump coupled in the fuel tank based on a position of the layer within the fuel tank relative to a threshold position. The controller may further perform a control routine, such as the routine of FIG. 4 to identify degradation of the layer of gel-foam fire retardant based on a purging frequency of a fuel system canister. An example fuel pump operation is described at FIG. 5. In this way, fuel vapors generated at a fuel tank are reduced, reducing costs involved in managing (e.g., storing and disposing) the vapors.

FIG. 1 shows a schematic depiction of a hybrid vehicle system 6 that can derive propulsion power from engine system 8 and/or an on-board energy storage device, such as a battery system (not shown). An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes an air intake throttle 62 fluidly coupled to the engine intake manifold 44 via an intake passage 42. Air may enter intake passage 42 via air filter 52. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in herein. In some embodiments, wherein engine system 8 is a boosted engine system, the engine system may further include a boosting device, such as a turbocharger (not shown).

Engine system 8 is coupled to a fuel system 18. Fuel system 18 includes a fuel tank 20 coupled to a fuel pump 21 and a fuel vapor canister 22. During a fuel tank refueling event, fuel may be pumped into the vehicle from an external source through refueling door 108. Fuel tank 20 may hold a plurality of fuel blends, including fuel with a range of alcohol concentrations, such as various gasoline-ethanol blends, including E10, E85, gasoline, etc., and combinations thereof. A fuel level sensor 106 located in fuel tank 20 may provide an indication of the fuel level 102 ("Fuel Level Input") to controller 12. As depicted, fuel level sensor 106 may comprise a float connected to a variable resistor. Alternatively, other types of fuel level sensors may be used. A detailed embodiment of fuel tank 20 and fuel pump 21 is described below at FIG. 2.

Fuel pump 21 is configured to pressurize fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel tank 20 may be routed to fuel vapor canister 22, via conduit 31, before being purged to the engine intake 23.

Fuel vapor canister 22 is filled with an appropriate adsorbent for temporarily trapping fuel vapors (including vaporized hydrocarbons) generated during fuel tank refueling operations, as well as diurnal vapors. In one example, the adsorbent used is activated charcoal. When purging conditions are met, such as when the canister is saturated, vapors stored in fuel vapor canister 22 may be purged to engine intake 23 by opening canister purge valve 112. While a single canister 22 is shown, it will be appreciated that fuel system 18 may include any number of canisters. In one example, canister purge valve 112 may be a solenoid valve wherein opening or closing of the valve is performed via actuation of a canister purge solenoid.

Canister 22 includes a vent 27 for routing gases out of the canister 22 to the atmosphere when storing, or trapping, fuel vapors from fuel tank 20. Vent 27 may also allow fresh air to be drawn into fuel vapor canister 22 when purging stored fuel vapors to engine intake 23 via purge line 28 and purge valve 112. While this example shows vent 27 communicating with fresh, unheated air, various modifications may also be used. Vent 27 may include a canister vent valve 114 to adjust a flow of air and vapors between canister 22 and the atmosphere. The canister vent valve may also be used for diagnostic routines. When included, the vent valve may be opened during fuel vapor storing operations (for example, during fuel tank refueling and while the engine is not running) so that air, stripped of fuel vapor after having passed through the canister, can be pushed out to the atmosphere. Likewise, during purging operations (for example, during canister regeneration and while the engine is running), the vent valve may be opened to allow a flow of fresh air to strip the fuel vapors stored in the canister. In one example, canister vent valve 114 may be a solenoid valve wherein opening or closing of the valve is performed via actuation of a canister vent solenoid. In particular, the canister vent valve may be an open that is closed upon actuation of the canister vent solenoid.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve 110 may be optionally included in conduit 31 such that fuel tank 20 is coupled to canister 22 via the valve. During regular engine operation, isolation valve 110 may be kept closed to limit the amount of diurnal or "running loss" vapors directed to canister 22 from fuel tank 20. During refueling operations, and selected purging conditions, isolation valve 110 may be temporarily opened, e.g., for a duration, to direct fuel vapors from the fuel tank 20 to canister 22. By opening the valve during purging conditions when the fuel tank pressure is higher than a threshold (e.g., above a mechanical pressure limit of the fuel tank above which the fuel tank and other fuel system components may incur mechanical damage), the refueling vapors may be released into the canister and the fuel tank pressure may be maintained below pressure limits. While the depicted example shows isolation valve 110 positioned along conduit 31, in alternate embodiments, the isolation valve may be mounted on fuel tank 20. In addition to isolation valve 110, in some embodiments, the fuel tank may be made of structurally reinforced material, such as steel, to improve the tolerance of the fuel tank to high fuel tank pressures (that result from fuel vapor generation in the fuel tank).

As further elaborated herein with reference to FIG. 2, a layer of gel-foam fire retardant 107 may also be included in the fuel tank to reduce an amount of fuel vapors generated in a dome region 103 of the fuel tank. The gel-foam fire retardant may be layered on the surface of liquid fuel in the fuel tank and an operation of fuel pump 21 may be adjusted based on a position of the layer within the fuel tank relative to a threshold position so as to reduce ingestion of the gel-foam fire retardant into the fuel pump. By layering the gel-foam fire retardant on the surface of fuel in the fuel tank, and reducing the amount of fuel vapors generated, the need for a structurally reinforced fuel tank is reduced. As such, this provides component cost reduction benefits. For example, the evaporative benefits of a bladder tank can be achieved without incurring the high costs of a bladder tank. Likewise, the need for a sealed steel fuel tank is reduced.

One or more pressure sensors 120 may be coupled to fuel system 18 for providing an estimate of a fuel system pressure. In one example, the fuel system pressure is a fuel tank pressure, wherein pressure sensor 120 is a fuel tank pressure sensor coupled to fuel tank 20 for estimating a fuel tank pressure or vacuum level. While the depicted example shows pressure sensor 120 directly coupled to fuel tank 20, in alternate embodiments, the pressure sensor may be coupled between the fuel tank and canister 22, specifically between the fuel tank and isolation valve 110. In still other embodiments, a first pressure sensor may be positioned upstream of the isolation valve (between the isolation valve and the canister) while a second pressure sensor is positioned downstream of the isolation valve (between the isolation valve and the fuel tank), to provide an estimate of a pressure difference across the valve.

Fuel vapors released from canister 22, for example during a purging operation, may be directed into engine intake manifold 44 via purge line 28. The flow of vapors along purge line 28 may be regulated by canister purge valve 112, coupled between the fuel vapor canister and the engine intake. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, engine speed-load conditions, an air-fuel ratio, a canister load, etc. By commanding the canister purge valve to be closed, the controller may seal the fuel vapor recovery system from the engine intake. An optional canister check valve (not shown) may be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) or manifold vacuum (ManVac) may be obtained from MAP sensor 118 coupled to intake manifold 44, and communicated with controller 12. Alternatively, MAP may be inferred from alternate engine operating conditions, such as mass air flow (MAF), as measured by a MAF sensor (not shown) coupled to the intake manifold.

Fuel system 18 may be operated by controller 12 in a plurality of modes by selective adjustment of the various valves and solenoids. For example, the fuel system may be operated in a fuel vapor storage mode (e.g., during a fuel tank refueling operation and with the engine not running), wherein the controller 12 may open isolation valve 110 and canister vent valve 114 while closing canister purge valve (CPV) 112 to direct refueling vapors into canister 22 while preventing fuel vapors from being directed into the intake manifold.

As another example, the fuel system may be operated in a refueling mode (e.g., when fuel tank refueling is requested by a vehicle operator), wherein the controller 12 may open isolation valve 110 and canister vent valve 114, while maintaining canister purge valve 112 closed, to depressurize the fuel tank before allowing enabling fuel to be added therein. As such, isolation valve 110 may be kept open during the refueling operation to allow refueling vapors to be stored in the canister. After refueling is completed, the isolation valve may be closed.

As yet another example, the fuel system may be operated in a canister purging mode (e.g., after an emission control device light-off temperature has been attained and with the engine running), wherein the controller 12 may open canister purge valve 112 and canister vent valve while closing isolation valve 110. Herein, the vacuum generated by the intake manifold of the operating engine may be used to draw fresh air through vent 27 and through fuel vapor canister 22 to purge the stored fuel vapors into intake manifold 44. In this mode, the purged fuel vapors from the canister are combusted in the engine. The purging may be continued until the stored fuel vapor amount in the canister is below a threshold. During purging, the learned vapor amount/concentration can be used to determine the amount of fuel vapors stored in the canister, and then during a later portion of the purging operation (when the canister is sufficiently purged or empty), the learned vapor amount/concentration can be used to estimate a loading state of the fuel vapor canister. For example, one or more oxygen sensors (not shown) may be coupled to the canister 22 (e.g., downstream of the canister), or positioned in the engine intake and/or engine exhaust, to provide an estimate of a canister load (that is, an amount of fuel vapors stored in the canister). Based on the canister load, and further based on engine operating conditions, such as engine speed-load conditions, a purge flow rate may be determined.

In some hybrid vehicle embodiments, when the canister load is higher than a threshold, purging conditions may be considered met. In response to the purging conditions, the canister may be opportunistically purged when the vehicle is operated in the engine mode. Specifically, while the engine is spinning, a canister purge valve is opened so that the intake manifold vacuum can be applied on the canister. By adjusting the purge valve, a flow rate of purging the fuel vapors into the engine intake for subsequent combustion can be controlled, thereby maintaining a desired engine exhaust air-to-fuel ratio. Alternatively, the vehicle may be actively shifted from a battery mode of operation (with the engine off) to an engine mode of operation (with the engine on) to allow the canister to be sufficiently purged. As such, since the canister can only be purged with the engine on, vapor generation may necessitate frequent canister purging, which in turn may require frequent engine operation over a hybrid vehicle's drive cycle. This reduces the vehicle's fuel economy. Herein, by using the layer of gel-foam fire retardant as an internal floating layer in the vehicle's fuel tank that remains on the surface of the fuel irrespective of the level of fuel in the fuel tank, fuel vapor generation is reduced, reducing the purging frequency of a fuel system canister. This reduces the engine-on time in a hybrid vehicle's drive cycle, providing fuel economy benefits.

Returning to FIG. 1, vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, MAP sensor 118, pressure sensor 120, pressure sensor 129, and fuel level sensor 106. Other sensors such as additional pressure, temperature, air/fuel ratio, and composition sensors may be coupled to various locations in the vehicle system 6. As another example, the actuators may include fuel injector 66, isolation valve 110, purge valve 112, vent valve 114, fuel pump 21, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-4.

Now turning to FIG. 2, an example embodiment 200 is shown of the fuel system of FIG. 1, in particular the fuel tank, the fuel pump, the layer of gel-foam fire retardant in the fuel pump, and associated components. All fuel system components previously introduced in FIG. 1 are numbered similarly in FIG. 2.

In the depicted example, fuel system 200 includes fuel tank 20 for storing a liquid fuel. For example, the liquid fuel may be gasoline, ethanol fuel, or a gasoline-ethanol blend fuel. The fuel system 200 further includes fuel pump 21 coupled in the fuel tank 20 for delivering fuel to an injector. That is, fuel pump 21 may be submerged (in the fuel) in the fuel tank. Fuel pump 21 includes an inlet 212 configured to receive fuel from the fuel tank. The fuel pump inlet 212 may be a screened inlet including a screen to reduce entry of sediments into the fuel pump. A bottom surface 214 of the fuel tank 20 is configured to include a depression 215. Fuel pump 21 may be positioned within the fuel tank 20, on the bottom surface 214, in particular, on depression 215. The shape of the bottom of the fuel tanks allows only fuel to be at the fuel pump inlet. In particular, depression 215 may be positioned slightly above the bottom or base of the fuel tank so as to reduce sediment ingestion by the fuel pump.

A layer of gel-foam fire retardant 107 may float on a surface of the liquid fuel in the fuel tank. The layer may be a continuous layer that does not include any components projecting from a middle of the layer. In addition, the layer may be not be tethered to any surface of the fuel tank (e.g., not tethered to an inner wall of the fuel tank) allowing the layer to freely float on the surface of the fuel. Thus, as a level of fuel in the fuel tank changes, a position of the layer in the fuel tank may also correspondingly change.

By layering the gel-foam fire retardant on the surface of the fuel, an amount of fuel vapors generated in dome region 103 of the fuel tank may be reduced. By reducing evaporative emissions in a fuel tank, various cost reduction benefits related to storing and purging the fuel vapors are achieved. For example, the need for a sealed steel tank for storing the vapors is reduced, a smaller canister can be used for adsorbing the fuel vapors, a purging frequency of the canister can be reduced, and further, engine operation frequency for purging the canister can be reduced. In addition, by layering the gel-foam fire retardant on the surface of the fuel, unwanted fuel vaporization that may occur in the event of tank degradation (e.g., tank rupture) can also be reduced.

A fuel level sensor 106 may be coupled to the layer of gel-foam fire retardant 107, in particular, at a periphery of the layer, for indicating a position of the layer within the fuel tank. In particular, the fuel level sensor may provide an indication regarding the position of the layer within the tank relative to a threshold position. The fuel level sensor 106 may be directly (as shown) or indirectly (e.g., via a control system) coupled to a fuel pump shut-off switch 206. A controller of the vehicle fuel system may include computer readable instructions for adjusting an operation of the fuel pump based on the position of the layer within the fuel tank relative to a threshold position. The threshold position may be adjusted based on a road incline. For example, a higher threshold position may be applied when the vehicle is travelling on a road with a higher incline. In another example, the threshold position may be based on one or more of a road incline, vehicle acceleration/deceleration, vehicle lateral acceleration (e.g., turning speed, turning rate), steering wheel angle, and vehicle yaw. As such, each of these parameters may affect the way fuel sways and sloshes in the fuel tank, affecting an apparent fuel level. Therefore, by adjusting the threshold position based on these parameters, a change in the position of the layer of gel-foam fire retardant in the fuel tank relative to a location of the fuel pump inlet in the fuel tank can be better compensated for.

The fuel level sensor 106 may include a level sensing arm 210 with a float 208. Based on the position of the level sensing arm, the fuel pump shut-off switch 206 may be actuated open or close. For example, when the level sensing arm 210 is in a first position (indicated by solid lines), the fuel pump shut-off switch 206 may be actuated open to enable fuel pump operation. In comparison, when the level sensing arm 210 is in a second position (indicated by dashed lines), the fuel pump shut-off switch 206 may be actuated closed to disable fuel pump operation.

In this way, a controller may adjust an operation of the fuel pump based on the position of the layer 107 within the fuel tank relative to the threshold position. As elaborated at FIG. 3, the adjusting may include enabling operation of the fuel pump when the position of the layer is above the threshold position and disabling the fuel pump when the position of the layer is below the threshold position.

The dome region 103 of fuel tank 20 may be coupled to a canister 22 configured to store fuel vapors generated in the fuel tank. A fuel system controller may include further instructions for intermittently purging fuel vapors from the canister to an engine intake of the vehicle. As such, by using the layer of gel-foam fire retardant, the purging frequency of the canister can be reduced. As elaborated at FIG. 4, the controller may further indicate degradation of the layer of gel-foam fire retardant based on a purging frequency of the canister over a vehicle drive cycle. For example, in response to the purging frequency being higher than a threshold over the vehicle drive cycle, it may be determined that the layer has become degraded and that the layer may need to be replaced.

In this way, the system of FIGS. 1-2 show a method for a vehicle fuel system coupled to an on-road vehicle wherein a layer of gel-foam fire retardant is floated on a surface of liquid fuel in a fuel tank to reduce an amount of fuel vapors generated in a dome region of the fuel tank. By adjusting operation of a fuel pump based on a position of a layer of gel-foam fire retardant in a fuel tank, the layer floating on a surface of fuel in the fuel tank, ingestion of gel-foam into the fuel pump is reduced.

Figure 3:
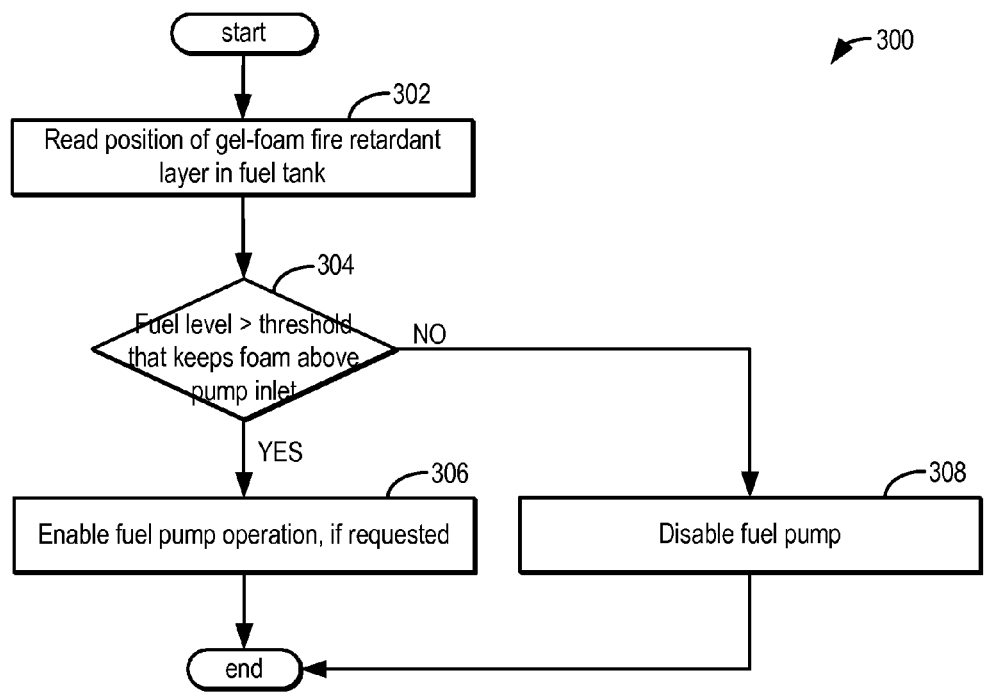
FIG. 3 shows a high level flow chart illustrating a routine that may be implemented for adjusting fuel pump operation based on a position of the layer of gel-foam fire retardant within the fuel tank.

Now turning to FIG. 3, an example routine 300 is shown for adjusting fuel pump operation based on a position of the layer of gel-foam fire retardant in the fuel tank, wherein the layer is floating on a surface of fuel in the fuel tank.

At 302, the routine includes reading a position of the layer of gel-foam fire retardant in the fuel tank. As such, the position of the layer may be correlated with a fuel level in the fuel tank since the layer is configured to freely float on the surface of liquid fuel in the fuel tank. In one example, a fuel level sensor may be coupled to the layer so as to provide an indication regarding the position of the layer in the fuel tank as well as a level of fuel in the fuel tank.

At 304, the position of the layer may be compared to a threshold position and it may be determined if the position of the layer is higher than (that is, above) the threshold position. As such, the fuel pump may be located within a depression at a bottom of the fuel tank and the threshold position may refer to a position that keeps the gel-foam fire retardant layer above the fuel pump inlet. Thus, the threshold position may be adjusted during vehicle operation based on one or more of a road incline (e.g., whether the vehicle is going uphill or downhill or on a flat surface), vehicle acceleration/deceleration, vehicle lateral acceleration (e.g., if the vehicle is swerving to take a left turn or right turn and further how fast the turn is being taken), steering wheel angle, and vehicle yaw. In still other embodiments, the threshold position may be adjusted based on other vehicle maneuvers such as aggressive braking maneuvers.

At 306, when the layer is above the threshold position, the routine includes enabling operation of the fuel pump (if requested). That is, the fuel pump may be operated to pump fuel for delivery to the injectors if engine operation is requested by a vehicle operator or required for purging a fuel system canister. In comparison, at 308, when the layer is below the threshold position, the routine includes disabling operation of the fuel pump. That is, the fuel pump may not be operated to pump fuel for delivery to the injectors if engine operation is requested by a vehicle operator or required for purging a fuel system canister. By disabling pump operation when the layer of gel-foam retardant approaches a position that is close to an inlet of the fuel pump (under the prevalent vehicle operating or maneuvering conditions), ingestion of fire retardant into the fuel pump is reduced.

Figure 4:
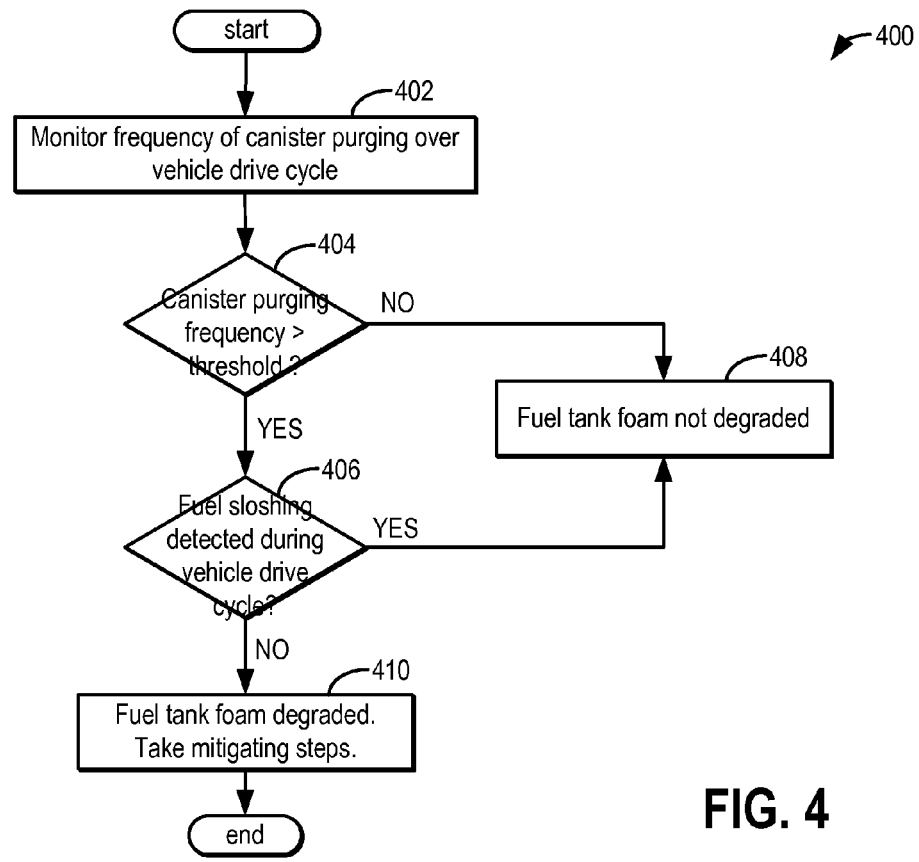
FIG. 4 shows a high level flow chart illustrating a routine that may be implemented for degradation of the layer of gel-foam fire retardant within the fuel tank.

Now turning to FIG. 4, an example routine 400 is shown for identifying and indicating degradation of the layer of gel-foam fire retardant in the fuel tank based on a purging frequency of a fuel system canister coupled to the fuel tank.

At 402, the routine includes monitoring a frequency of canister purging over a vehicle drive cycle. As such, fuel tank vapors generated in the dome region of the fuel tank may be stored in a fuel system canister coupled to the fuel tank. Then, when the canister is sufficiently full (such as when a pressure of the canister is higher than a threshold, or when a loading of the canister is higher than a threshold), the canister may be purged. Purging the canister includes operating the engine and opening a purge control valve to use the engine intake manifold vacuum to draw in the fuel vapors from the canister into the engine for combustion in cylinders.

At 404, the routine includes comparing the purging frequency of the canister to a threshold rate. In one example, the threshold rate may be based on an average or historic purging frequency of the vehicle, as averaged over a number of previous drive cycles, and as based on the vehicle's drive history. At 408, in response to the purging frequency of the fuel system canister over the vehicle drive cycle being lower than the threshold rate, no degradation of the layer of gel-foam fire retardant may be indicated.

In comparison, if the purging frequency of the fuel system canister, over the vehicle drive cycle, is higher than the threshold rate, the routine proceeds to 406 to determine if any fuel sloshing had occurred. As such, during selected vehicle maneuvers, such as swerving turns, travel on an incline, travel on a rough surface, etc., fuel may slosh in the fuel tank and some fuel may slosh over the layer of gel-foam fire retardant. That is, some liquid fuel may spill on to an upper surface of the layer that is otherwise not in contact with liquid fuel. When this fuel evaporates, an amount of fuel vapor generated in the dome region of the fuel tank is (temporarily) increased (that is, increased above what would have been generated in the absence of fuel sloshing). The excess vapors may also cause a temporary increase in the frequency of canister purging.

Fuel sloshing may be determined based on the output from a vehicle accelerometer. In another example, fuel sloshing may be determined based on track and road data from a vehicle navigation system. If fuel sloshing is determined, the routine returns to 408 to indicate that the fuel tank gel-foam layer is not degraded. That is, in response to the purging frequency of the fuel system canister over a vehicle drive cycle being higher than a threshold rate while fuel sloshing is detected, a vehicle controller indicates no degradation of the layer of gel-foam fire retardant.

In comparison, if fuel sloshing is not determined, then at 410, the routine includes indicating that the fuel tank gel-foam layer is degraded. That is, in response to the purging frequency of the fuel system canister over the vehicle drive cycle being higher than the threshold rate while fuel sloshing is not detected, indicating degradation of the layer of gel-foam fire retardant. In addition, in response to the indication of degradation of the layer of gel-foam fire retardant, a controller may perform one or more mitigating actions. For example, the controller may set a diagnostic code (e.g., an MIL) to notify the vehicle operator that the layer of gel-foam fire retardant needs to be replaced. In another example, the controller may increase an engine operation time of the hybrid electric vehicle. That is, the controller may reduce engine shutdown times or automatic engine inhibit times, to enable increased canister purge frequency.

Figure 5:
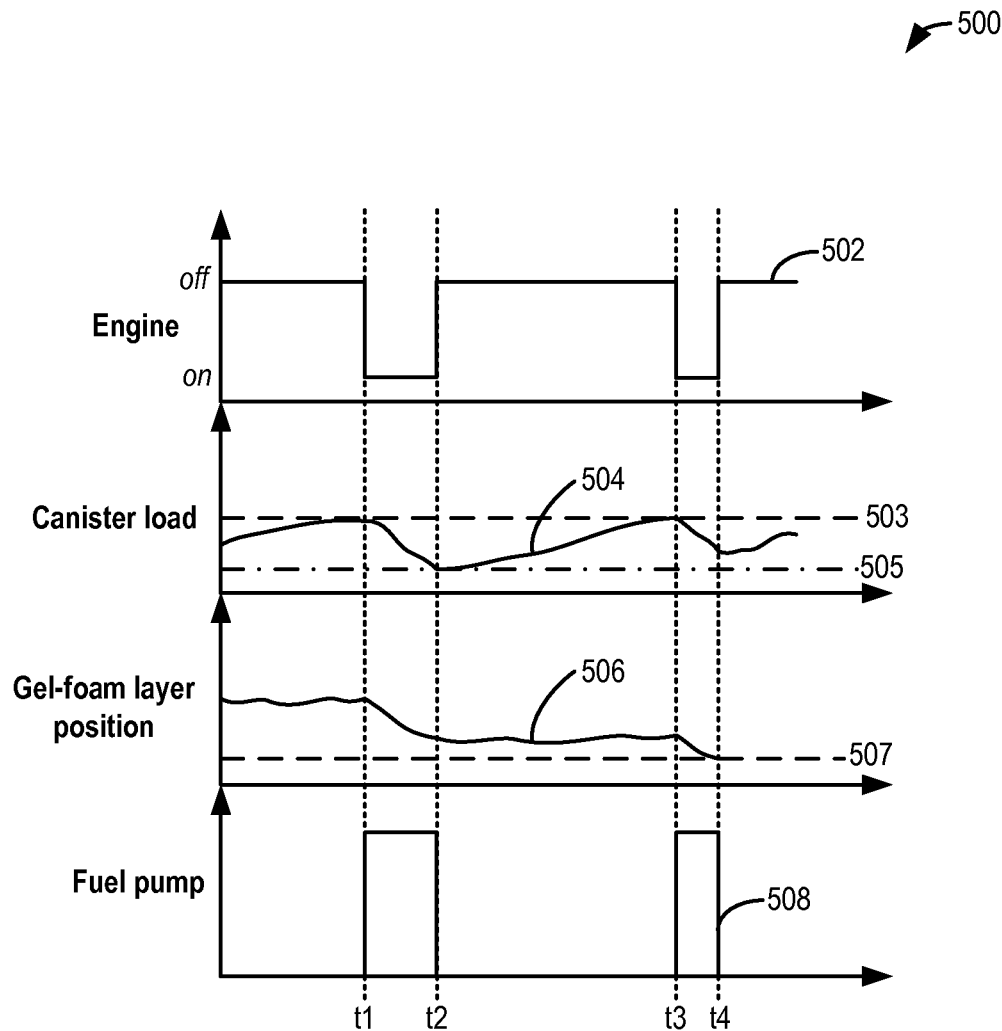
FIG. 5 shows an example fuel pump operation.

Now turning to FIG. 5, map 500 depicts an example adjustment to a fuel pump operation based on a position of gel-foam fire retardant layered on the surface of fuel in a fuel tank relative to a threshold position. Map 500 shows a hybrid vehicle mode of operation with the engine-on (engine mode) or engine-off (battery mode) at plot 502, changes in a canister load at plot 504, changes in a position of the gel-foam fire retardant layer at plot 506, and fuel pump operation at plot 508.

Prior to t1, the hybrid vehicle may be operating in the battery mode with the engine off and with the vehicle being propelled with power from a system battery (plot 502). While operating in the engine off mode, diurnal fuel tank vapors may be generated and stored in a fuel system canister coupled to the fuel tank. Thus, before t1, a canister load may be gradually increasing (plot 504). At t1, the canister load may reach an upper threshold 503 in response to which canister purging conditions may be confirmed. Accordingly, an engine operation request may be made at t1 so that the canister load can be purged into an engine intake. As such, at t1, a position of the layer of gel-foam fire retardant may be above threshold position 507. Thus, at t1, in response to the request for engine operation for purging the canister load being received while the gel-foam fire retardant layer is above the threshold position 507, a vehicle controller may enable the fuel pump. As a result, between t1 and t2, the fuel pump may be operated to purge the canister load. At t2, in response to the canister load reaching a lower threshold 505, the canister may be considered sufficiently purged and the engine operation may be discontinued and the fuel pump may be disabled.

Between t2 and t3, the hybrid vehicle may again be operating in the battery mode with the engine off and with the vehicle being propelled with power from a system battery. In addition, while operating in the engine off mode, diurnal fuel tank vapors may be generated and stored in a fuel system canister coupled to the fuel tank. Thus, between t2 and t3, the canister load may increase (plot 504). At t3, the canister load may once again reach upper threshold 503 in response to which canister purging conditions may be confirmed. Accordingly, an engine operation request may be made at t3 so that the canister load can be purged into an engine intake. At t3, the position of the layer of gel-foam fire retardant may still be above threshold position 507. Thus, at t3, in response to the request for engine operation for purging the canister load being received while the gel-foam fire retardant layer is above the threshold position 507, a vehicle controller may enable the fuel pump. As a result, between t3 and t4, the fuel pump may be operated to purge the canister load. At t4, during the canister purging, while the engine is operating, fuel may be consumed and the position of the gel-foam fire retardant may fall below the threshold position 507. In response to the gel-foam fire retardant layer being at or below the threshold position 507, the fuel pump may be disabled to avoid ingesting any of the gel-foam fire retardant into the fuel pump (in particular into an inlet of the fuel pump). Herein, fuel pump operation is disabled even though the canister has not been sufficiently purged (that is, before the canister load reaches lower threshold 505). Canister purging may then be delayed until a fuel tank refill event has occurred and the layer of gel-foam fire retardant is returned to a position above the threshold position. The controller may update a look-up table mapping the canister load based on the disabling of the fuel pump. In some embodiments, to complete the canister purging without operating the fuel pump, the vehicle controller may adjust engine operation to more aggressively use the purged fuel vapors from the canister to run the engine without activating the fuel injectors.

In this way, evaporative emissions may be reduced in a simple and cost effective manner. By layering a gel-foam fire retardant on the surface of fuel in a hybrid vehicle's fuel tank coupled, generation of fuel vapors is reduced. By lowering the amount of evaporative emissions, component and fuel economy costs incurred during the management of fuel vapors is reduced. In particular, the need for a costly and bulky structurally reinforced fuel tank is reduced while also reducing the engine-on time required to purge the stored fuel vapors from a canister. In addition, the use of a gel-foam fire retardant as a layer reduces unwanted fuel vaporization and fire hazards that may occur in the event of tank degradation. By adjusting fuel pump operation based on the position of the layer within the fuel tank, ingestion of the gel-foam fire retardant into the fuel pump can be reduced. Overall, vehicle emissions compliance can be achieved at lower operational costs.

Note that the example control routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. A method for a vehicle fuel system, comprising floating a layer of gel-foam fire retardant on a surface of liquid fuel in a fuel tank to reduce an amount of fuel vapors generated in a dome region of the fuel tank, the vehicle being an on-road vehicle wherein the fuel system includes a fuel level sensor coupled to the layer of gel-foam fire retardant for indicating a position of the layer in the fuel tank.

2. The method of claim 1, wherein the fuel system further includes a fuel pump coupled in the fuel tank, the method further comprising, disabling operation of the fuel pump in response to the position of the layer being lower than a threshold position.

3. The method of claim 2, wherein the threshold position is based on a road incline, the threshold position being higher as the vehicle travels on a higher incline.

4. A method for a vehicle fuel system, comprising:
adjusting operation of a fuel pump based on a position of a layer of gel-foam fire retardant in a fuel tank, the layer floating on a surface of fuel in the fuel tank.

5. The method of claim 4, wherein the adjusting includes enabling operation of the fuel pump when the layer is above a threshold position and disabling operation of the fuel pump when the layer is below the threshold position.

6. The method of claim 5, wherein the threshold position is based on one or more of a road incline, vehicle acceleration/deceleration, vehicle lateral acceleration, steering wheel angle, and vehicle yaw.

7. The method of claim 6, wherein the fuel pump is located within a depression at a bottom of the fuel tank.

8. The method of claim 4, wherein fuel tank vapors are stored in a fuel system canister coupled to the fuel tank, the method further comprising, indicating degradation of the layer based on a purging frequency of the fuel system canister.

9. The method of claim 8, wherein the indicating includes, in response to the purging frequency of the fuel system canister over a vehicle drive cycle being higher than a threshold rate while no fuel sloshing is detected, indicating degradation of the layer of gel-foam fire retardant; and in response to the purging frequency of the fuel system canister over the vehicle drive cycle being higher than the threshold rate while fuel sloshing is detected, indicating no degradation of the layer of gel-foam fire retardant.

10. The method of claim 9, further comprising, in response to the indication of degradation of the layer of gel-foam fire retardant, increasing engine an operation time to enable increased canister purge frequency.

11. The method of claim 10, wherein fuel sloshing is determined based on a vehicle accelerometer and/or a vehicle navigation system.

12. A fuel system coupled to a vehicle, comprising: a fuel tank for storing a liquid fuel; a fuel pump coupled in the fuel tank for delivering fuel to an injector; and a layer of gel-foam fire retardant floating on a surface of the liquid fuel in the fuel tank, a fuel level sensor coupled to the layer of gel-foam fire retardant for indicating a position of the layer within the fuel tank.

13. The system of claim 12, further comprising, a controller with computer readable instructions for, adjusting an operation of the fuel pump based on the position of the layer within the fuel tank relative to a threshold position.

14. The system of claim 13, wherein a bottom surface of the fuel tank includes a depression and wherein the fuel pump is positioned within the fuel tank, on the depression of the bottom surface.

15. The system of claim 14, wherein the fuel pump includes a fuel pump inlet configured to receive fuel from the fuel tank and wherein the threshold position is based on a location of the fuel pump inlet.

16. The system of claim 15, wherein adjusting the operation of the fuel pump includes, enabling operation of the fuel pump when the position of the layer is above the threshold position and disabling the fuel pump when the position of the layer is below the threshold position.

17. The system of claim 16, further comprising a canister coupled to the fuel tank for storing fuel vapors generated in the fuel tank, wherein the controller includes further instructions for intermittently purging fuel vapors from the canister to an engine intake of the vehicle.

18. The system of claim 17, wherein the controller includes further instructions for indicating degradation of the layer of gel-foam fire retardant based on a purging frequency of the canister over a vehicle drive cycle.

* * * * *